Feb. 11, 1936.   D. M. WARNER   2,030,418
TESTING MACHINE
Filed July 28, 1931   2 Sheets-Sheet 1
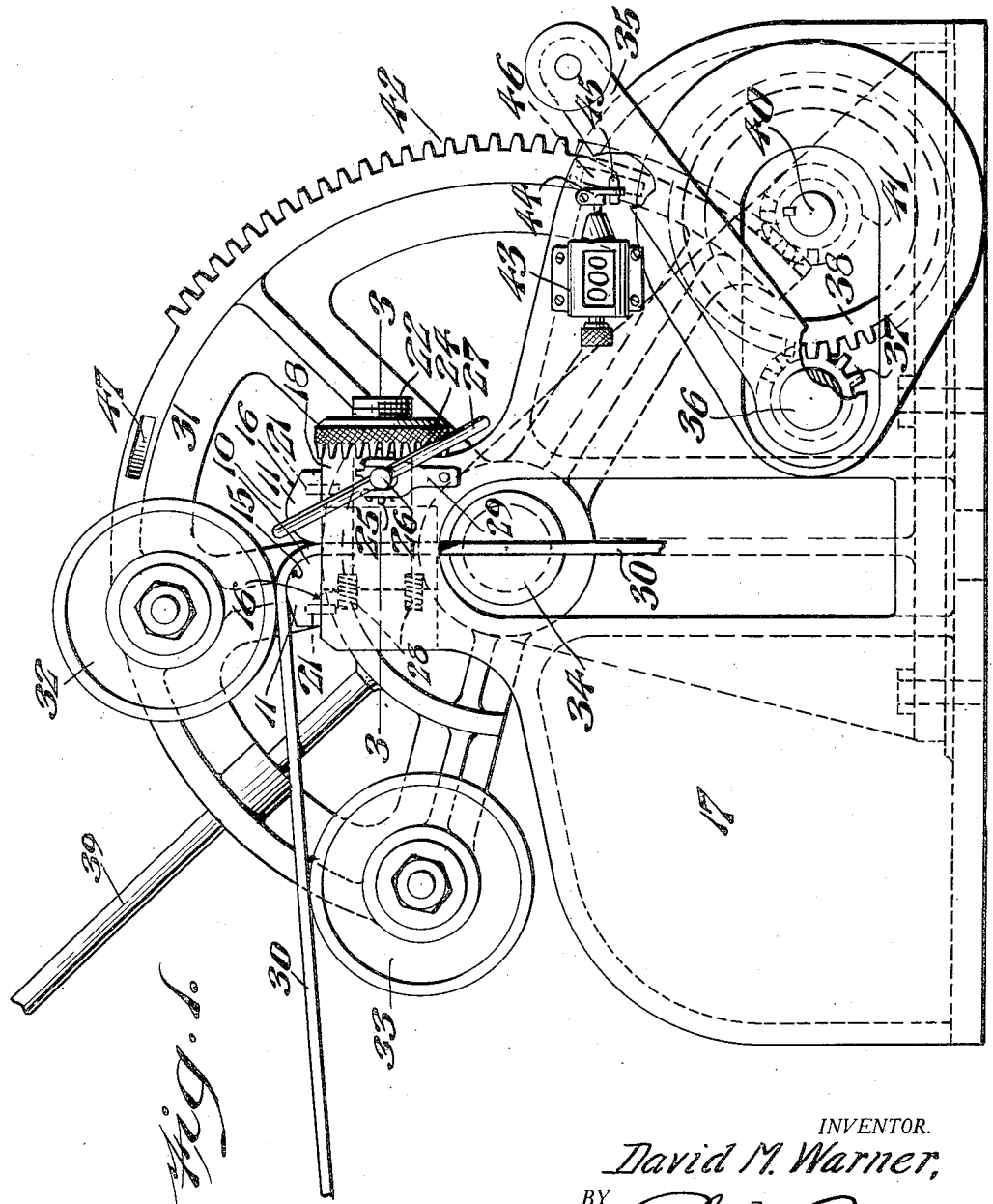
INVENTOR.
David M. Warner,
BY Robert M. Barr
ATTORNEY.

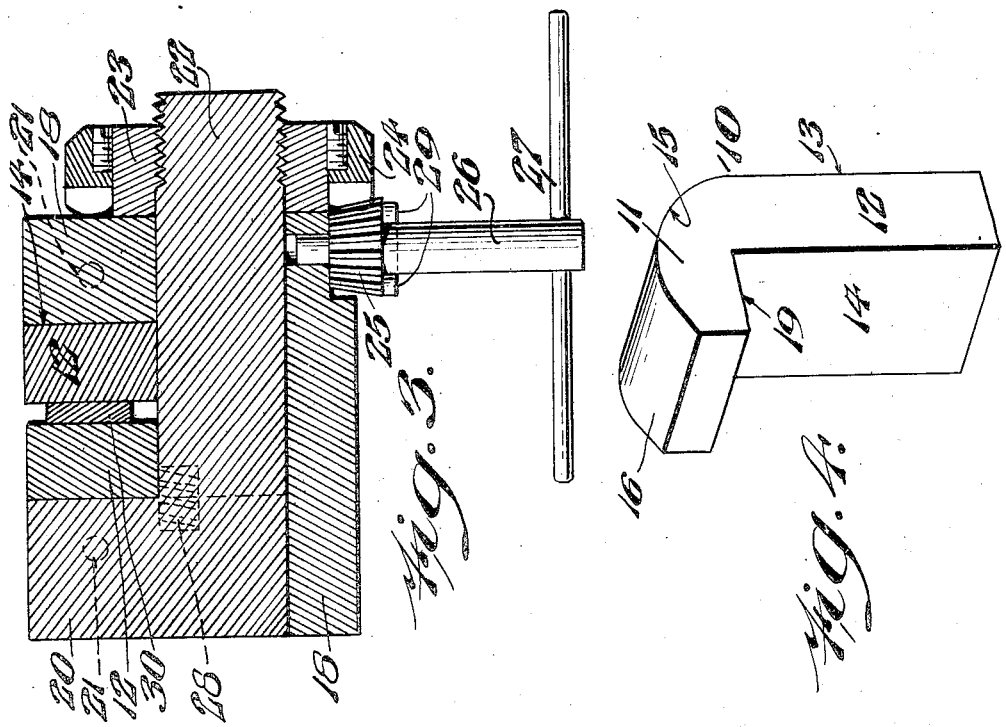
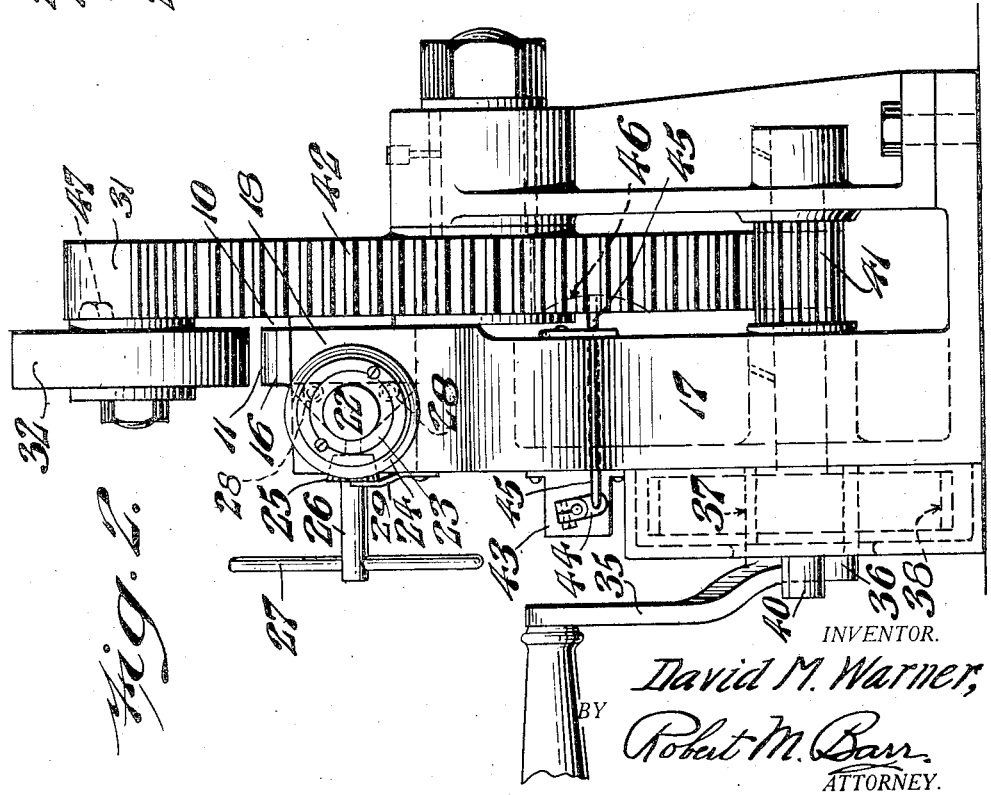

Patented Feb. 11, 1936

2,030,418

UNITED STATES PATENT OFFICE 2,030,418

TESTING MACHINE

David M. Warner, Dayton, Ohio, assignor to Tinius Olsen Testing Machine Company, Philadelphia, Pa., a corporation of Pennsylvania Application July 28, 1931, Serial No. 553,579

4 Claims. (Cl. 73—51)

The present invention relates to testing machines and more particularly to a machine for determining the ductility of material.

In the testing of wire for tensile strength it has been the usual practice to measure the percentage of elongation of the material and while this is a tried and accepted method it has been found unsatisfactory in the testing of wire for use as tension members in airplanes and other places where the wire is subject to vibration. Ductility therefore becomes a very essential requirement of tension members made of wire and subjected to vibration.

Some of the objects of the present invention are to provide a machine for accurately testing the ductility of wire either in the form of round bar stock or flat bar stock or any other configuration; to provide a testing device for bending and reverse bending wire wherein the number of bends for any given material becomes substantially a constant regardless of an increase or decrease in the diameter of the wire under test; to provide a testing machine that will produce bends in the material with a minimum of cold working such as surface hammering, reduction or abrasion or the addition of tension stresses other than those produced in the bend itself; to provide a machine for testing for ductility of a material wherein the results obtained by different operators are always the same for the same kind of material; to provide a testing machine having interchangeable adapter jaws varying in dimensions to conform respectively to the different standard wire sizes; to provide a testing machine arranged to bend the material under test back and fourth through a predetermined angle without subjecting the material to shearing action; to provide means for registering the number of bends made by a testing machine upon a given test piece; to provide a novel anvil jaw for testing machines operating by bending a test piece; to provide an anvil jaw for testing machines wherein the curvature of the jaw or jaws bears a definite predetermined relation to the thickness of the material under test; and to provide other improvements as will hereinafter appear.

In the accompanying drawings Fig. 1 represents a side elevation of wire testing machine embodying one form of the present invention; Fig. 2 represents an end elevation of the same; Fig. 3 represents a detail section on line 3—3 of Fig. 1; and Fig. 4 represents a perspective of one of the material gripping jaws.

Referring to the drawings one form of the present invention consists of a pair of anvil adapter jaws 10, each having a head 11 and an elongated shank 12 extending therefrom to provide a relatively long gripping face 13. Preferably the two jaws 10 are of like configuration and when mounted for operation the two faces 13 are juxtaposed in parallel relation. Preferably also the back faces 14 of the shanks 12 are respectively parallel to the gripping faces 13 so that pressure upon the faces 14 causes one shank to move towards the other while maintaining the gripping faces 13 in exact parallelism. Where the gripping face 13 of each shank meets the head 11 it merges into an arc 15 which forms one portion of an anvil face of which the downwardly inclined face 16 forms the other part. The portion of the anvil face formed by the arc 15 plays an important part in the solution of the problem of test bending in that the radius of the arc 15 has a very definite relation to the thickness of the material to be tested and a very practical relation has been taken as giving excellent results by adopting a radius equal to three times the thickness of the wire or piece under test. It will thus be evident that for each wire or piece of a given thickness there are a pair of the adapter jaws 10, each pair having an arc radius proportioned to the thickness of the wire it is to be used with. Another consideration is the overall width of a pair of the adapter jaws 10 plus the thickness of the wire held between them because it is desirable this should be the same in each instance so that the associated machine can be, so to speak, universal in application. Therefore where the thickness of the test material is relatively small there will be a corresponding increase in the thickness of the jaw shanks 12 and where the test material thickness is relatively large there will be a corresponding decrease in the thickness of the jaw shanks 12. Each adapter jaw 10 is plainly marked with the wire thickness for which it is made rather than with the size of its radius, as this makes for expedious use, in that the user merely has to micrometer the wire for thickness and then select the corresponding adapter jaws without having to make any calculations. It should also be noted that the head 11 of each adapter jaw 10 projects laterally outward from the shank back face 14 to provide a support surface 19 for seating upon an associated part.

For the purpose of causing the jaws 10 to grip a part under test, a vise structure is provided consisting of a frame 17 carrying a vise head 18 which is recessed to receive the shanks 12 of a pair of the adapter jaws 10 plus the movable clamping member 20 of the vise. Thus as will be seen from Fig. 3 one of the shanks 12 abuts a fixed wall of the head 18 while the other shank 12 is engaged by the member 20. The heads 11 of the jaws 10 are respectively connected by dowel pins 21, or otherwise, to the head 18 and the member 20 and consequently are removably anchored in place, one being fixed and the other movable with the member 20 towards and away from the fixed jaw. The member 20 is preferably integral with an offset bolt 22 having its threaded end projecting at one end of the head 18 to receive a tapped bushing 23 which is rotated by a sleeve gear 24 in mesh with a pinion 25 keyed to an operating spindle 26. The spindle 26 is journalled in the head 18 and also in a yoke 29, while a rod 27 serves as a manually operable means for rotating the pinion 25 and gear 24 to feed the bolt 22 axially in the desired direction. When the bushing 23 is turned in the direction to release the vise action, coil springs 28, (which are compressed between the offset portion of the member 20 and the head 18), expand and give a quick release of the jaws 10. In released position of the jaws 10 a test piece 30, (here shown as a flat strip wire, though it may be round or any other suitable section), can be inserted vertically downward between the jaws 10 and when the latter are clamped thereon the projecting upper end of the piece or wire is ready for a bending test.

In order to bend the test piece 30 to the right through an angle of ninety degrees across one anvil face and then to the left through an angle of one hundred and eighty degrees across the other anvil, a rack segment 31 is provided carrying two circumferentially spaced bending rollers 32 and 33 both the same radial distance from the axis of rotation 34 of the segment 31. Also it should be noted that the diameter of the rollers 32 and 33 is relatively large so that a good leverage is obtained against the test piece to start the bending action without the semblance of any shearing action. The mounting radius and the roller diameter are so proportioned that the arc of travel of the rollers is spaced from the anvil faces approximately a distance equal to the thickness of the test piece. It should be noted that the axis of the mounting for the rollers 32 and 33 is located in the plane of the fixed part of the specimen and spaced from the point of bending. This construction causes the rollers to travel in an arc across the area of bending and also lengthwise of the specimen toward the area of bending, this lengthwise travel taking place alternately by the rollers according to the direction of oscillation. As a result the leverage of the applied force changes continuously during a testing operation so that the specimen is bent along a relatively short predetermined length of the specimen instead of being subjected to bending action at different points in its projecting length as happens where the leverage remains constant. Provision is made for oscillating the segment 31 manually by a handle 39 which is fast to the movable part and projects therefrom to a convenient distance for proper leverage and easy operation. Also provision is made for manually oscillating the segment 31 through power multiplying means which is here shown in the form of a crank 35 keyed to the shaft 36 carrying a pinion 37. A gear 38 is keyed to a countershaft 40 which carries a pinion 41 in mesh with a rack 42 formed on a portion of the periphery of the segment 31.

As it is essential to know the exact number of 90 degree bends the test piece is subjected to before rupture, a counter 43 is mounted upon the frame 17 with its spring return operating arm 44 pivoted to a push-rod 45. This rod 45 is slidably guided through the frame 17 and has its free end abutting one side of the segment 31, being so held by the action of the counter arm spring. Two cam depressions 46 and 47 of arc shape are formed in the juxtaposed segment side at appropriate intervals so that when the test piece is bent through each ninety degree bend one of the depressions will pass opposite the rod 45 to allow it to first move into the depression for the setting stroke of the counter and then to return it for the release stroke of the counter. In this way each and every complete ninety degree bend of the test piece is registered upon the counter to give the required data.

In the operation of the device the user first determines the thickness of the wire to be tested by applying a micrometer thereto. Having found the thickness of the wire, the pair of jaws 10 corresponding to this size is inserted in the recess of the head 18 in position to be clamped by the hook offset part 20 of the bolt 22. In this connection attention is directed to the fact that each pair of jaws is marked with the size of the wire it is to be used with for test purposes. The test wire is now placed between the jaws 10 and the hand rod 27 rotated in the direction to cause the pinion 25 to turn the sleeve gear 24 and thereby clamp the test piece 30 rigidly in place with one end projecting upwardly between the rollers 32 and 33. Having set the counter 43 to zero or taken a reading thereof the segment 31 is swung first in one direction so that the roller 33 bends the wire through a predetermined angle, and then in the opposite direction so that the roller 32 engages the opposite side of the wire and makes a reverse bend. Each ninety degree bend of the material is registered upon the counter 43 by the successive actuation of the rod 45 by the cams 46 and 47. This oscillation of the frame 31 may be made either through manipulation of the direct drive handle 39 or through the crank 35 and its associated power amplifying pinion 37, gear 38, pinion 41 and rack 42. The number of oscillations up to the point of rupture becomes a measure of the ductility of the material and it has been found by tests in the machine of the present invention that the number of bends is the same on all wires of like quality regardless of size.

It will now be apparent that a complete unitary bending machine for testing wire has been devised whereby determination of the ductility of a material can be easily and accurately obtained. Furthermore the results can be reached without mathematical computation and hence the use of the machine is not confined solely to skilled engineers as it can be operated with equal accuracy by unskilled mechanics. It should be noted that it is unnecessary in this machine to cut the wire to be tested or to supply short lengths for test because the central vertical opening of the frame is coincident or alined with the space between the jaws and hence the wire can be passed down through the opening while its upper end projects into the path of the bending rollers 32 and 33. Also it will be evident that a feature of the invention resides in the fact that no change in the adjustment of the machine is necessary when making a change in the size of wire to be tested. All that is required in such a case is the mere substitution of the adapters corresponding to the new size wire and which are marked with the diameter of that wire. This is important because if adjustments were necessary an operator could easily make a wrong adjustment.

While but one form of the present invention is here shown by way of example it is to be understood that many variations might be made without departing from the invention and therefore it is to be understood that the invention is not to be limited or restricted by the specification and claims to the exact details here described and illustrated. Also it is to be understood that other types of vises can readily be adapted for use with the invention, such for example as a double acting vise without departing from the invention.

Having thus described my invention, I claim:

1. A machine for testing the ductility of a material comprising a vise, a pair of jaws for said vise for gripping a test piece to hold said piece with one end projecting from said jaws, heads respectively on said jaws, each head having an anvil face curving upwardly and laterally from the gripping face of the jaw, the curvature of said anvil face being proportioned to the thickness of said test piece to cause bending without shearing action, a frame mounted for oscillating movement, rollers carried by said frame and spaced a predetermined distance apart to respectively engage opposite sides of said test piece according to the direction of movement of said frame, the arrangement being such that one roller travels along the projecting portion of the test piece toward the bending point and the other roller travels simultaneously away from said bending point and means to oscillate said frame.

2. A machine for testing the ductility of a material comprising a vise arranged to hold a specimen projecting outwardly therefrom and forming an axis about which said specimen is arranged to be bent, bending members arranged to engage opposite sides of said specimen and mounted to rotate about a common axis located in the plane of the fixed part of the specimen, said common axis being spaced from the aforesaid axis of bending, and means to oscillate said members whereby said specimen is always bent without localized work hardening effect.

3. A machine for testing the ductility of a material comprising a vise to hold a specimen projecting outwardly therefrom and forming an axis about which the projecting end of said specimen can be bent, two bending members arranged to engage opposite sides respectively of said end, and means to cause said members to travel with said end in one member only in contact with said end in one direction of movement and the other member only in contact with said end in the opposite direction of movement, said travel being in an arc extending at its ends below the axis of bend and at its medial portion above said axis.

4. A machine for testing the ductility of material comprising a vise arranged to hold a specimen projecting outwardly therefrom, bending members for applying a bending force alternately to opposite sides of said specimen, means including a pivot for mounting said members to allow each member to alternately travel lengthwise of the specimen towards said vise and in an arc above and below the horizontal plane of said vise so that the leverage of the applied force varies during a bending action, and means for oscillating said mounting means.

DAVID M. WARNER.